(12) United States Patent
Seiger

(10) Patent No.: US 8,439,544 B2
(45) Date of Patent: May 14, 2013

(54) HEADLIGHT FOR A MOTOR VEHICLE WITH TEMPERATURE-COMPENSATED HOLDER FOR A LAMP MODULE

(75) Inventor: Ralf Seiger, Lippstadt (DE)

(73) Assignee: Hella KGaA Hueck & Co., Lippstadt (DE)

( * ) Notice: Subject to any disclaimer, the term of this patent is extended or adjusted under 35 U.S.C. 154(b) by 400 days.

(21) Appl. No.: 12/741,591

(22) PCT Filed: Nov. 6, 2008

(86) PCT No.: PCT/EP2008/065064
§ 371 (c)(1),
(2), (4) Date: May 5, 2010

(87) PCT Pub. No.: WO2009/060032
PCT Pub. Date: May 14, 2009

(65) Prior Publication Data
US 2010/0259946 A1    Oct. 14, 2010

(30) Foreign Application Priority Data
Nov. 7, 2007   (DE) .......................... 10 2007 052 985

(51) Int. Cl.
    *B60Q 1/04* (2006.01)
(52) U.S. Cl.
    USPC ........... 362/548; 362/549; 362/507; 362/523; 362/285; 362/418
(58) Field of Classification Search .................. 362/507, 362/508, 523–537, 232, 249.03–249.09, 362/362/285, 287, 288, 372, 418, 419, 429, 362/549, 548
See application file for complete search history.

(56) References Cited

U.S. PATENT DOCUMENTS

| | | | |
|---|---|---|---|
| 3,859,516 A * | 1/1975 | Tuzson .......................... | 362/468 |
| 3,925,656 A * | 12/1975 | Andres et al. .................. | 362/468 |
| 4,052,609 A * | 10/1977 | Martin .......................... | 362/468 |
| 5,365,414 A * | 11/1994 | Chikada et al. ............... | 362/462 |
| 5,500,790 A * | 3/1996 | Chikada et al. ............... | 362/462 |
| 2008/0043482 A1 * | 2/2008 | Leitretter et al. ............. | 362/508 |

FOREIGN PATENT DOCUMENTS

| | | |
|---|---|---|
| DE | 3518404 A1 | 11/1985 |
| DE | 10360182 A1 | 8/2005 |
| DE | 10360184 A1 | 8/2005 |
| EP | 1437545 A2 | 7/2004 |
| FR | 2687762 A1 | 8/1993 |

* cited by examiner

*Primary Examiner* — Bao Q Truong
(74) *Attorney, Agent, or Firm* — Husch Blackwell LLP; Robert C. Haldiman; H. Frederick Rusche

(57) ABSTRACT

This invention relates to a vehicle headlamp (1) with a base body (2) containing at least one light module (3) for emitting low beam light, whereby the low beam light is emitted at a specified angle or within an angle range.
The invention envisages that the fixture of the light module (3) in the headlamp (1) must have at least one expansion joint (5), whereby temperature-related deviations in the emission of the low beam light from the specified angle or the specified angle range can be compensated by the temperature-related expansion of the expansion joint (5).

13 Claims, 3 Drawing Sheets

Figure 1:
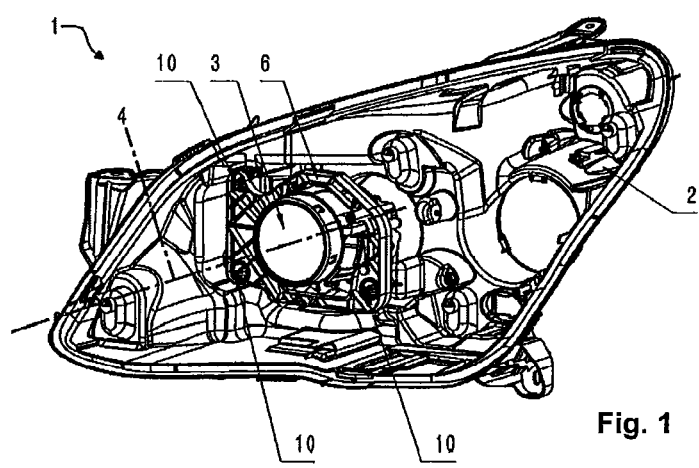

HEADLIGHT FOR A MOTOR VEHICLE WITH TEMPERATURE-COMPENSATED HOLDER FOR A LAMP MODULE

CROSS REFERENCE TO RELATED APPLICATIONS

This application is a U.S. National Phase Application of International Application PCT Application No. PCT/EP2008/065064 filed on Nov. 6, 2008, which claims the benefit of priority from German Patent Application No. 10 2007 052 985.8 filed on Nov. 7, 2007. The disclosures of International Application PCT Application No. PCT/EP2008/065064 and German Patent Application No. 10 2007 052 985.8 are incorporated herein by reference.

This invention relates to a vehicle headlamp with a base body containing at least one light module for emitting low beam light, whereby the low beam light is emitted at a specified angle or within an angle range.

The low beam light emitted by a headlamp has a light-dark boundary which must adhere to a certain height relative to the horizontal so as not to dazzle oncoming traffic, for example. The light-dark boundary must therefore lie within a specified angle range. In order to adhere to the angle and/or angle range, the light module must adhere to a specific angle of inclination both in the headlamp and to the vehicle horizontal, whereby the light-dark boundary increases impermissibly if the light module tilts backward in the opposite direction to the direction of travel, whereas if it tilts forward, it generates too low a cone of light, since the light-dark boundary shifts downward.

The inclination of the light module can change as a result of thermal influences on the headlamp and, in particular, on the light module fixture. The exact inclination of the light module is influenced both by the outside temperature and, for example, by the heat from the engine or the heat given off by the lamp within the light module to the interior of the headlamp. During operation of the headlamp or when starting the vehicle at low temperatures, the light module might therefore adopt a different angle of inclination that when the vehicle operates for longer periods at higher temperatures. As a result, the light-dark boundary can increase impermissibly and dazzle the oncoming traffic.

Patent application DE 35 18 404 A1 addresses a vehicle headlamp with a dimming shield that is mounted in a bracket with the aid of an auxiliary piece, whereby the relative dimensions and linear coefficients of thermal expansion of the bracket, dimming shield and auxiliary piece are such that the upper limiting edge of the dimming shield maintains its position without changing relative to the horizontal regardless of any changes in operating time.

The disadvantage of such a design is the extremely elaborate fixture for the light module, which cannot be a single-part design but must be divided into a reflector and a projection lens on both the front and back sides and fastened to a base. This functions together with a holder on which the lens is positioned, whereas the reflector must be positioned on the base. In particular, an auxiliary mounting piece is necessary to mount the shield, which generates the light-dark boundary, within the light module. As a result, only an unalterable position of the shield relative to the horizontal can be achieved. By contrast, any tilting of the entire unit—consisting of reflector and lens—in the headlamp cannot, for example, be compensated. As such, the thermal compensation only affects the components of the light module itself, whereas any tilting by the light module in the headlamp and/or in the vehicle cannot be compensated.

This invention therefore needs to provide a vehicle headlamp that enables the temperature-insensitive fixture of the light module in the headlamp for the purpose of ensuring adherence to a specified angle or angle range for emitting the low beam light.

This task is resolved on the basis of a vehicle headlamp as defined in the generic description in claim 1 in conjunction with the characterizing features. Expedient further improvements in the invention are indicated in the other derived Claims.

The invention incorporates the technical doctrine that the fixture of the light module in the headlamp must have at least one expansion joint, whereby temperature-related deviations in the emission of the low beam light from the specified angle or the specified angle range can be compensated by the temperature-related expansion of the expansion joint.

The solution devised by the invention for using an expansion joint in the light module fixture in the headlamp enables the specific selection of a simple component for allowing the automatic compensation of the deviation of an emitting low beam light from a specified angle or angle range relative to the horizontal or vertical in relation to the vehicle. The selection of a suitable expansion joint in terms of both material and geometry can be determined either through experimentation or mathematically. The expansion joint forms part of the light module fixture in the headlamp and creates a mechanical connection which is, therefore, tied into the chain of various connecting elements between the light module and the vehicle. The temperature of the expansion joint changes if the temperatures in the headlamp change. The positioning of the expansion joint relative to the light module fixture is designed to ensure that changes in the inclination of the light module in the headlamp in an initial direction are balanced out by the simultaneous increase in the temperature of the expansion joint. When using the expansion joint as derived in this invention, the temperature at which the headlamp is operated in the vehicle is irrelevant since the compensation of thermal expansion and the ensuing tilting of the light module by the expansion joint take place evenly over a large temperature range.

The expansion joint can be incorporated into the headlamp as either one direct, or several expansion joints, whereby preferably a retaining frame can be provided to fix the light module in the headlamp. Fastening elements are used to attach the retaining frame, either in a fixed position or in a position that can be adjusted to a defined extent, to the base body of the headlamp, whereby the retaining frame is basically O-shaped, with a central aperture for mounting the light module. Both the base body of the headlamp and the retaining frame can be made of glass fiber reinforced plastic with minimum thermal expansion properties. Nevertheless, the size of the structures and sensitivity of the light module to tilts can cause thermal drifts that are large enough to necessitate a compensation of the positioning of the light module in the headlamp.

A further development of the invention envisages at least one expansion joint between the retaining frame and the light module. Three fixing elements preferably extend between the retaining frame and the light module to form a mounting plane for fixing the light module. In doing so, two extremely rigid fixing elements could be positioned in the lower section between the retaining frame and the light module. These two fixing elements form a type of jointed connection since the inclination of the light module changes in the range of <1 mm and the two fixing elements positioned at the bottom can be jointed, in spite of their high degree of rigidity. The third fixing element is positioned in the upper section between the retaining frame and the light module and, according to the invention, formed by the expansion joint.

The light module substantially consists of a reflector and projection lens, which are housed in a module body. The module body is elongated in the horizontal direction and houses the reflector on the back and the projection lens on the front. Since the elongation plane of the retaining frame is located between the reflector and the projection lens, the option exists, on the one hand, to position the expansion element between the retaining frame and the area of the light module reflector or, on the other hand, to position it between the retaining frame and the area of the projection lens, whereby the light-distributing unit can also be a reflector module. Depending on the positioning of the expansion element, the light-dark boundary of the low beam light either increases when the temperature rises if the expansion joint is positioned between the retaining frame and the area of the reflector, or can be decreased if the expansion joint is located between the retaining frame and the area of the projection lens in the light module.

Positioning the expansion joint on the upper side exposes it to the waste heat of the lamp in the light module reflector. When the overall headlamp system increases in temperature, this consequently produces the advantage that the expansion joint is heated to marginally higher temperatures in order to reinforce the effect of compensation.

The design of the expansion joint as a cylindrical or truncated cone shape with lengthwise elongation in a cylinder axis is advantageous. Alternatively, the expansion joint can be shaped as a cube or oblong with rectangular or square cross-section, or even as a hexagon, similar to a screw head. In addition, two or more expansion joints can also be positioned between the retaining frame and the light module to create enhanced joint strength. In a further development, the light module can also be completely fixed by expansion joints in the retaining frame, whereby the upper and lower fixtures in each case are juxtaposed between the light module and the retaining frame. For example, if the expansion joints on the upper side are positioned between the retaining frame and the side of the light module reflector, their counterparts on the lower side are located between the retaining frame and the area of the projection lens. This produces an aggregation of the compensation paths of the expansion joints to the extent that—provided the temperatures are the same—the compensation paths are doubled and the tilting of the light module is corrected by the double amount.

In a further design variant of the invention, the retaining frame has a mounting geometry with a cantilevered fixing point in the direction of the cylinder axis for mounting the expansion joint to create an enlarged free length (L) for the expansion joint between the retaining frame and the light module. Alternatively, a cantilevered fixing point can be provided for mounting the expansion joint in the light module, whereby cantilevered fixing points can also be provided on both components to extend the expansion joint in the direction of the cylinder axis. The mounting geometry as defined in the invention allows the installation of an expansion joint with a free minimum length between the retaining frame and the light module without changing the overall design. The cantilevered area of the frame can be connected in one piece, for example by means of plastic injection or injection molding, as an overall component with the mounting geometry. The mounting geometry consists of an arm-shaped area with a disk-shaped end in the center of which a fastening hole is provided for bolting the expansion joint. The direction of the cantilevered fixing point extends in the direction of the projection lens in the light module, thus enabling the expansion joint to be incorporated into the mounting geometry and the opposite end of the expansion joint to form a uniform mounting plane with the two fixing elements positioned at the bottom in the retaining frame, similar to the conventional design with three normal fixing elements. The higher the degree of cantilevering of the fixing point in the mounting geometry is, the longer can be the expansion joint chosen and the greater is the geometrical temperature compensation. The retaining frame and the mounting geometry are made of glass fiber reinforced plastic to minimize any expansions of the material that may occur when the temperature changes.

A further advantage of this invention is that the expansion joint is made of a plastic material, whereby the end surfaces of the cylindrical or truncated cone-shaped body are used to mount it on the retaining frame and light module. The plastic material is a thermoplastic compound made, preferably, of polybutylene terephthalate (PBT), polyamide (PA), polycarbonate (PC), polyoxymethylene (POM) or polymethyl methacrylate (PMMA). The coefficients of thermal expansion of these plastics range between $50*10EX-6$ $1/K$ and $200*10EX-6$ $1/K$.

Given existing designs of headlamps and light modules fixed by retaining frames, the length of the expansion joint can be between 20 and 50 mm, preferably in the range between 30 and 40 mm and, particularly preferably, 35 mm. A length of 35 mm and a temperature change of 30K, for example, can produce a change of 0.15 mm in the length of the expansion joint if, for example, polybutylene terephthalate (PBT) is chosen as the material for the expansion joint. A tilting of the light module caused by an expansion by 0.15 mm of the expansion joint can be sufficient to ensure adherence to the level of the light-dark boundary in the specified angle and/or the specified angle range at a temperature difference of 30K. Moreover, the strengths of the plastic materials mentioned above ensure sufficient rigidity of the light module fixture in the retaining frame, in spite of their thermal expansion properties.

Further measures to improve the invention are explained in more detail using the illustrations below, together with the description of a preferred design example for the invention.

Figure 2:
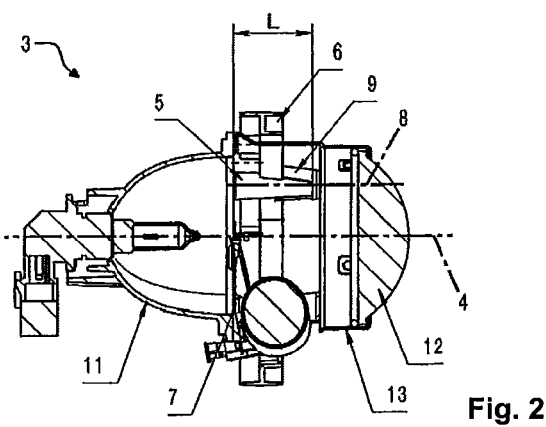
Figure 3:
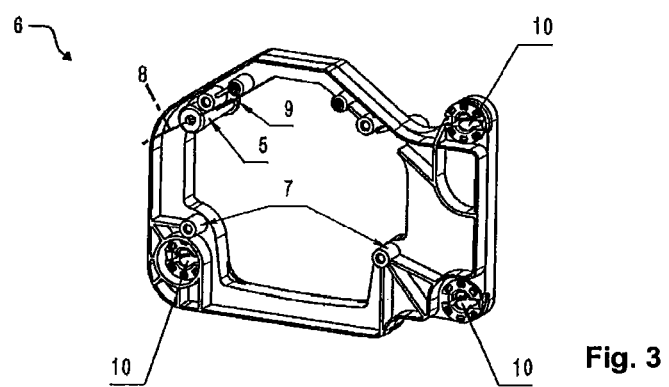

The following are shown:

FIG. 1 a perspective view of a headlamp with a retaining frame for mounting a light module, where an expansion joint as defined in the invention is positioned in accordance with this invention;

FIG. 2 a cross-section side view of the light module fixture in the retaining frame of a headlamp as defined in FIG. 1 with an expansion joint as defined in this invention, and FIG. 3 a perspective view of a retaining frame with an expansion joint as defined in the invention for mounting a light module.

The headlamp 1 shown in FIG. 1 has a base body 2, which also serves as the housing of the headlamp 1. A light module 3 is incorporated into the base body 2 using a retaining frame 6. To this end, the retaining frame 6 is initially mounted on the base body 2 of the headlamp 1 using three fastening elements 10. In this design example, the fastening elements 10 are jointed elements that sustain the adjustability of the retaining frame, whereby the upper of the three fastening elements can be supplemented by a mechanism for adjusting the headlight range.

The base body of the retaining frame 6 is O-shaped, with the light module 3 positioned through its center. The light module 3 has a horizontal 4 which serves as a reference for aligning the low beam light to be emitted.

FIG. 2 shows the cross-section of a light module 3, indicating a reflector 11 on the left-hand side and a projection lens 12 on the right-hand side. The reflector 11 and the projection lens 12 are housed in a module body 13 with a lengthwise elongation in the direction of the horizontal 4. On the reflector side, the module body 13 comprises the reflector 11, which is normally made of deep-drawn steel sheeting or cast aluminum, whereas the right-hand side includes a holder for mounting the projection lens 12 in the module body 13.

FIG. 3 shows a retaining frame 6, which is shown in cross-section in FIG. 2, and whose elongation plane is approximately perpendicular to the horizontal 4 on the center of the module body 13. The base body of the retaining frame 6 has an O-shaped cutout inside, through which the light module 3 extends. The light module 3 is attached to the retaining frame 6 by means of three fixing elements 7, whereby the cross-sectioned view only shows one fixing element 7 in the lower section. An expansion joint 5 as defined in the invention is positioned on the upper side between the retaining frame 6 and the light module 3, which also performs the function of a fixing element. The expansion joint 5 is positioned between the reflector area of the module body and a mounting geometry 9, which is shaped on the retaining frame 6. The expansion joint 5 has a free length (L) and extends in the direction of a cylinder axis 8. The geometry of the expansion joint 5 is a truncated cone shape that reduces in the direction of the mounting geometry 9. The direction of elongation of the cylinder axis 8 is parallel to the horizontal 4.

If the compilation of light module 3 and retaining frame 6 increases in temperature, the expansion joint 5 will increase in temperature to the same or a similar degree. The increase in temperature can cause the light module 3 to tilt relative to the horizontal 4. This tilting can be caused by thermal expansion, either of the light module 3 itself, the retaining frame 6, the headlamp, or the headlamp fixture in the vehicle. Depending on what causes the light module 3 to tilt, the expansion joint 5 serves to compensate the tilting by also expanding in increased temperatures. The rigidly connected fixing elements 7 form a jointed axis and do not cause any temperature-related shifts in the position of the light module 3. If the expansion joint 5 increases in temperature, however, it expands and causes the light module 3 to tilt relative to the horizontal 4 in the opposite direction of the direction of travel in the direction of reflector 11. The length, material and temperature sensitivity of the expansion joint 5 can be dimensioned such that the emitted low beam light maintains a consistent and temperature-dependent angle relative to the horizontal 4 in order to prevent the light-dark boundary of the low beam light from exceeding the permissible angle or angle range to the horizontal 4.

The invention does not relate solely to the preferred design example described above. On the contrary, a large number of variants that use the solution as represented above are conceivable, even on designs that are fundamentally different.

REFERENCE LIST

1 Headlamp
2 Base body
3 Light module
4 Horizontal
5 Expansion joint
6 Retaining frame
7 Mounting element
8 Cylinder axis
9 Mounting geometry
10 Fastening element
11 Reflector
12 Projection lens
13 Module body
L Free length

The invention claimed is:

1. A headlamp for a vehicle comprising:
a base body containing at least one light module for emitting low beam light, said low beam light being emitted at a specified angle or within an angle range;
a light module fixture in the headlamp said fixture having at least one expansion joint, whereby temperature-related deviations in the emission of the low beam light from the specified angled or outside the specified angle range is compensated by a temperature-related expansion of the expansion joint; and
the light module being mounted on a retaining frame in the headlamp, and the specified angle or angle range is produced relative to horizontal or vertical in relation to the vehicle.

2. The headlamp as defined in claim 1, further comprising said expansion joint being positioned between the retaining frame and the light module.

3. The headlamp as defined in claim 1, further comprising: three fixing elements being positioned between the retaining frame and the light module to form a mounting plane for fixing the light module.

4. The headlamp as defined in claim 3, further comprising rigid fixing elements being positioned in the lower section between the retaining frame and the light module, and an upper section of one fixing element being comprised of the expansion joint.

5. The headlamp as defined in claim 1, further comprising said expansion joint being cylindrical or shaped as a truncated cone with an elongation in a cylinder axis.

6. The headlamp as defined in claim 1, further comprising a mounting geometry of a retaining frame has a cantilevered fixing point in the direction of the cylinder axis for mounting the expansion joint, in order to create an enlarged free length for the expansion joint between the retaining frame and the light module.

7. The headlamp as defined in claim 1, further comprising said expansion joint is made of a plastic material, whereby the end surfaces of the cylindrical or truncated cone-shaped body are used to mount the expansion joint on a retaining frame and said light module.

8. The headlamp as defined in claim 7, further comprising said plastic material being a thermoplastic compound.

9. The headlamp of claim 8 wherein said thermoplastic compound is selected from the group consisting of polybutylene terephthalate (PBT), polyamide (PA), polycarbonate (PC), polyoxymethylene (POM) and polymethyl methacrylate (PMMA).

10. The headlamp as defined in claim 1 further comprising said length of the expansion joint is between 20 mm and 50 mm, preferably between 30 mm and 40 mm and particularly preferably 35 mm, in order to ensure a change in length of at least 0.15 mm at a temperature change of 30K, whereby the coefficient of thermal expansion is at least 145*10EX-6 1/K.

11. A headlamp for a vehicle comprising:
a base body containing at least one light module for emitting low beam light, said low beam light being emitted at a specified angle or within an angle range;
a light module fixture in the headlamp said fixture having at least one expansion joint, whereby temperature-related deviations in the emission of the low beam light from the specified angled or outside the specified angle range is compensated by a temperature-related expansion of the expansion joint;

the light module being mounted on a retaining frame in the headlamp, and the specified angle or angle range is produced relative to horizontal or vertical in relation to the vehicle; and three fixing elements being positioned between the retaining frame and the light module to form a mounting plane for fixing the light module.

12. The headlamp as defined in claim 11, further comprising rigid fixing elements being positioned in the lower section between the retaining frame and the light module, and an upper section of one fixing element being comprised of the expansion joint.

13. The headlamp as defined in claim 11, further comprising a mounting geometry of a retaining frame has a cantilevered fixing point in the direction of the cylinder axis for mounting the expansion joint, in order to create an enlarged free length for the expansion joint between the retaining frame and the light module.

\* \* \* \* \*